United States Patent Office 2,753,354
Patented July 3, 1956

2,753,354
ISONICOTINOYLAMINOBIGUANIDE

Henry F. Hammer, Niantic, Conn., assignor to Chas. Pfizer & Co., Inc., Brooklyn, N. Y., a corporation of Delaware No Drawing. Application June 22, 1954,
Serial No. 438,596

5 Claims. (Cl. 260—295)

This invention is concerned with a synthetic chemical agent which has a high order of activity against certain microorganisms. In particular, it is concerned with a complex derivative of isonicotinic acid.

A variety of synthetic materials have been proposed from time to time as agents which are of value for the suppression or control of the growth of microorganisms. Such materials are useful not only in therapy when the compound possesses a low order of toxicity, but also for controlling the growth of microorganisms in various industrial materials and also in food products and other materials of this nature. It has now been found that a compound known as isonicotinoylaminobiguanide is highly active against certain microorganisms, particularly Mycobacteria, such as *Mycobacterium tuberculosis* some of which cause serious diseases. The above term "isonicotinylamino biguanide" includes not only the basic compound itself but also salts which may be formed from this compound with various acids, including mineral acids, such as sulfuric acid, phosphoric acid, nitric acid, hydrochloric acid and so forth. Organic acids such as citric acid, tartaric acid, succinic acid, acetic acid, fumaric acid and so forth may also be used.

Isonicotinoylaminobiguanide may be prepared by the condensation of isonicotinoylhydrazine, also known as isoniazid, and dicyandiamide. The reaction may be brought about by contacting the approximately equimolecular quantities of the two materials, most favorably in the presence of an inert solvent, such as a lower (up to about 4 carbon) aliphatic alcohol (e. g., ethanol, methanol, isopropanol, butanol) dioxane, glycol ethers, etc. The application of heat to such a mixture appreciably accelerates the rate of reaction. It is often necessary to heat the mixture for several hours in order to assure reasonably complete reaction. The product may then be isolated by removal of the solvent. It is often obtained in crystalline form and may be recrystallized from lower aliphatic alcohols such as methanol.

Acid addition salts of isonicotinoylaminobiguanide may be prepared by contacting the basic compound with the desired acid in water or in a polar solvent such as methanol, ethanol, isopropanol or acetone. These acid addition salts contain one or more molecular proportions of the acid to each molecular proportion of isonicotinoylaminobiguanide. Care must be exercised to prevent decomposition of the product during its preparation and use.

The following examples are given by way of illustration and are not to be considered as the sole embodiments of this invention. It is to be understood that protection hereof is only limited by the specific wording of the appended claims.

Example I

A solution of 6.8 grams of isoniazid and 10.2 grams of dicyandiamide in 200 milliliters of methanol was refluxed for nine hours. The mixture was then evaporated to dryness under vacuum. The residual material was recrystallized twice from methanol. The colorless crystalline product melted at 143.5–145° C. Recrystallization two times from water yielded 4.3 grams of pure product with a melting point of 145–145.5° C. This material was analyzed.

*Analysis.*—Calcd. for $C_8H_{11}N_7O$: C, 43.43; H, 5.01; N, 44.32. Found: C, 43.44; H, 5.17; N, 44.40.

Example II

One gram of isonicotinoylaminobiguanide was suspended in 20 milliliters of water. One molecular proportion of dilute aqueous hydrochloric acid was added to the suspension. The mixture was carefully evaporated to dryness under vacuum and the residual monohydrochloride of isonicotinoylaminobiguanide was removed from the flask.

What is claimed is:

1. A member of the group consisting of isonicotinoylaminobiguanide and the non-toxic acid addition salts thereof.
2. Isonicotinoylaminobiguanide.
3. A hydrochloride of isonicotinoylaminobiguanide.
4. A process for the preparation of isonicotinoylaminobiguanide, which comprises contacting isoniazid and dicyandiamide in an inert organic solvent.
5. A process as claimed in claim 4, which comprises contacting isoniazid and dicyandiamide in an inert organic solvent at an elevated temperature.

References Cited in the file of this patent

UNITED STATES PATENTS

| | | |
|---|---|---|
| 2,352,944 | D'Alelio | July 4, 1944 |
| 2,456,090 | Simons | Dec. 14, 1948 |
| 2,480,514 | Simons | Aug. 30, 1949 |

OTHER REFERENCES

Elderfield: Heterocyclic Compounds, vol. 1, p. 569 (1950), John Wiley and Sons.